United States Patent [19]

Movick

[11] 4,224,925
[45] Sep. 30, 1980

[54] HEATING SYSTEM

[76] Inventor: Nyle O. Movick, 4600 Macky Way, Boulder, Colo. 80302

[21] Appl. No.: 936,340

[22] Filed: Aug. 24, 1978

[51] Int. Cl.² ............................................. F24D 11/00
[52] U.S. Cl. ................................... 126/427; 417/118; 126/430; 126/433
[58] Field of Search ................ 237/1 A, 67, 8 R, 9 R; 126/271, 270, 427, 430, 433; 417/108, 86, 120, 126, 118; 62/2

[56] References Cited

U.S. PATENT DOCUMENTS

| 524,718 | 8/1894 | Jencks et al. | 417/118 |
|---|---|---|---|
| 2,932,287 | 4/1960 | Goetz | 417/126 |
| 4,050,445 | 9/1977 | Huse | 126/271 |
| 4,061,131 | 12/1977 | Bohanon | 237/1 A X |
| 4,111,189 | 9/1978 | Dizon | 165/104 S |
| 4,120,289 | 10/1978 | Bottum | 237/1 A X |
| 4,131,231 | 12/1978 | Cleer | 237/1 A X |

Primary Examiner—Ronald C. Capossela
Assistant Examiner—Henry Bennett
Attorney, Agent, or Firm—Stephen A. Gratton

[57] ABSTRACT

A heating system for heating a building or the like wherein a working fluid is heated by heat sources such as fireplace heat collectors or solar heat collectors is vaporized, and then circulated in a closed loop to a lower level of the building where the heat is extracted by condensing the vapor back to a liquid. The extracted heat is stored at the lower level of the building in a storage tank and can then be easily distributed throughout the building as required for heating the building. A closed circulating loop for the working fluid keeps the heated vaporized working fluid circulating from the heat collectors down to the heat storage tank for condensation and the condensed liquid working fluid circulating from the storage tank up to the heat collectors for reheating. The circulating loop utilizes gravity and the pressure generated by vaporizing the working fluid to move the working fluid through the system without external pumps or controls and with no additional energy input.

13 Claims, 3 Drawing Figures

SYSTEM SCHEMATIC

SYSTEM SCHEMATIC

HEATING SYSTEM

FIELD OF THE INVENTION

The present invention relates to heating systems and more particularly to a new and improved system for heating a building wherein a working fluid is heated by a heat source such as a fireplace or solar collector and then circulated to a lower level of the building where the heat is extracted for storage and distribution.

BACKGROUND OF THE INVENTION

Heating systems in which a fluid is heated and then thermally circulated through a closed loop to other parts of the building are well known in the prior art. Generally such systems utilize a heat source such as a boiler that is located at a lower level of the building to heat a medium such as water for circulation through the loop. In systems of this type thermal circulation is generally utilized to circulate the heating medium with the relatively low density heated water and steam rising to the upper portions of the building where the heat can be extracted, and the relatively high density condensate flowing by gravity back to the lower level heat source for reheating.

A limitation with such heating systems is that to utilize thermal circulation to distribute the heat, the heat sources must always be located at the lower portions of the building. Some heat sources such as solar collectors or fireplace collectors generally cannot be located at the lowest levels of the building and therefore require additional mechanical apparatus such as pumps or blowers to transfer the collected heat from their level to lower levels of the building where the heat can be used or stored. The use of pumps and blowers in systems of this type not only expends considerable energy but also requires expensive equipment and controls.

Accordingly, it is an object of the present invention to provide a heating system in which heat is circulated from an elevated level of a building to a lower level for storage and distribution without additional energy or output.

Another object of the invention is to tie multiple heat collectors such as solar collectors and fireplace collectors into one integrated system that requires no external pumps or energy to move the collected heat to other parts of the building.

Yet another object of the invention is to provide a novel heating system wherein heat is collected and transferred to a lower level storage tank whenever the input temperature of the heat collectors is slightly higher than the storage tank temperature and wherein heat input into the system will follow the storage tank temperature.

SUMMARY OF THE INVENTION

A heating system for heating buildings or the like wherein a liquid working fluid is heated by various heat sources such as fireplace heat collectors and solar collectors to transform the liquid to a vapor. The heat laden vaporized working fluid is then circulated to a heat storage tank at a lower level of the building where the heat is extracted by condensing the vapor back to a liquid. The condensed liquid is then circulated back through the collectors for reheating. From the lower level heat storage tank the extracted heat can then be easily distributed throughout the building utilizing conventional heat exchangers and natural thermal circulation.

The heat collectors are adapted to contain the working fluid and to provide the heat input for boiling the working fluid. The working fluid is preferably a refrigerant such as one of the refrigerants in the "Freon" family manufactured by the DuPont Company, that will boil at different pressures over a wide temperature range. The vapor produced by boiling the working fluid is circulated in a closed loop to a heat exchanger submersed in a heat storage liquid within the heat storage tank. When the temperature of the heat storage liquid is below the condensation temperature of the working fluid the vaporized working fluid is condensed in the heat exchanger back to a liquid and the heat or vaporization of the working fluid is extracted into the storage liquid. A heat distribution system then extracts the heat from the storage liquid and distributes it throughout the building utilizing natural thermal circulation.

The closed circulating loop functions to maintain the heat laden vaporized working fluid produced by the heat collectors circulating into the heat exchanger for heat extraction into the storage liquid and also maintains the cooled and condensed working fluid exiting from the heat exchanger circulating back to the heat collectors for reheating. The closed circulating loop generally comprises a lower collecting reservoir and an upper distributing reservoir connected to each other and other components of the system by sealed conduits. The lower collecting reservoir is a sealed vessel located below the heat collectors and heat storage tank and collects vaporized working fluid from each heat collector along with condensed working fluid from the heat exchanger. The lower collecting reservoir is pressurized by the accumulation of the vaporized working fluid and the pressure forces the mixture of vaporized and condensed working fluid upward to the upper distributing reservoir that is also sealed, where the vapor and condensate are separated. From the upper distributing reservoir the vapor is directed by gravity through conduits to the heat exchanger in the storage tank for heat extraction and the condensate is directed by gravity through conduits to the heat collectors for reheating.

The arrangement is such that as the temperature of the storage liquid rises with heat input from the working fluid the pressure in the system also rises so that the working fluid boils and condenses at higher temperatures. Thus over the operating range of the system the pressure is varied so that the working fluid will always condense at a temperature below the temperature of the storage liquid and the heat input into the system will in effect follow the temperature of the storage liquid.

Other objects, advantages and capabilities of the present invention will become more apparent as the description proceeds taken in conjunction with the accompanying drawing in which like parts have similar reference numerals and in which.

DETAIL DESCRIPTION OF THE INVENTION

Figure 1:
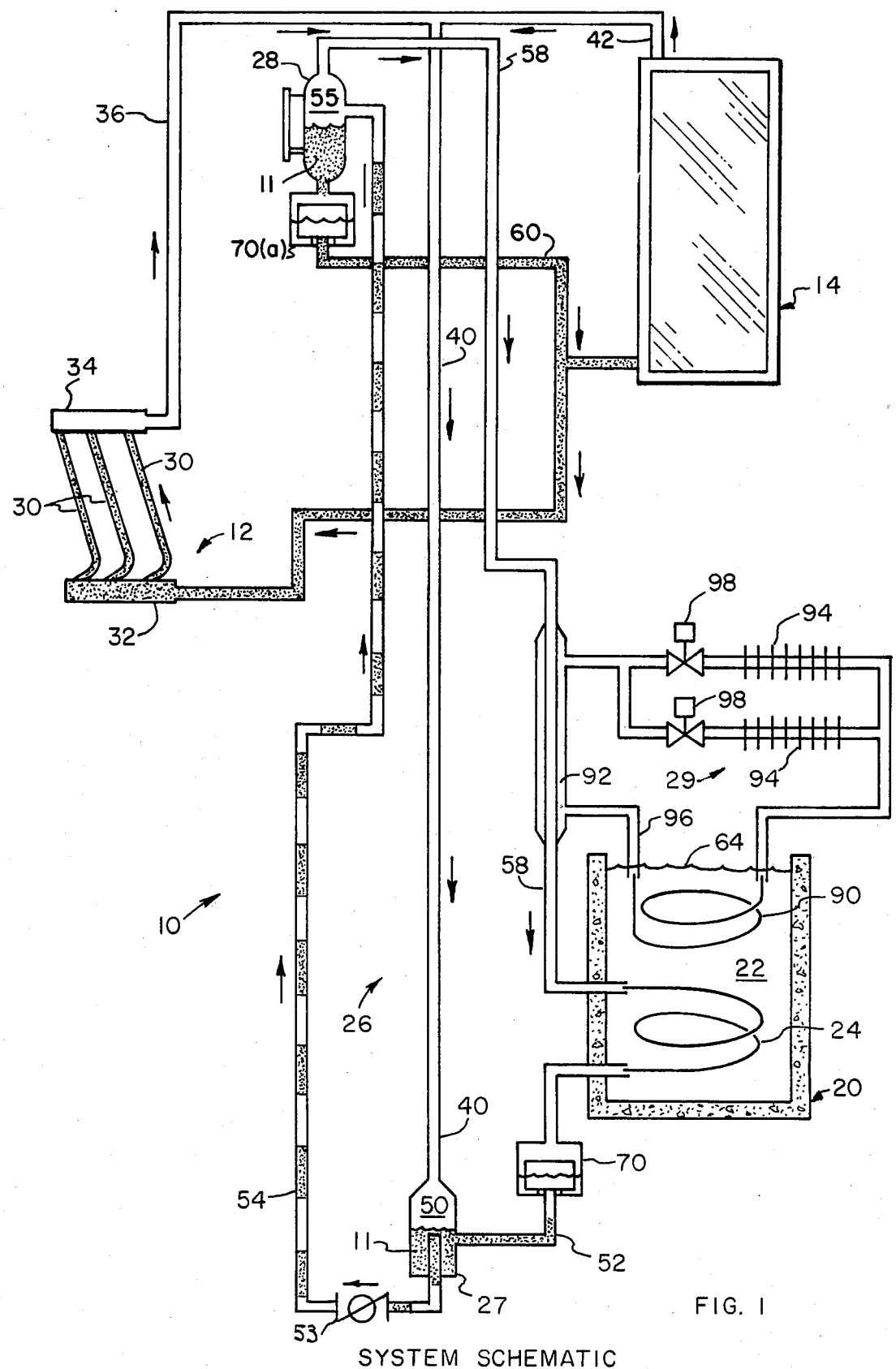
FIG. 1 is a diagrammatic side elevation view of the heating system of the invention.

Referring now to FIG. 1 an illustrative embodiment of the heating system of the invention designated as 10, is shown and generally stated comprises; a working fluid 11 illustrated in its liquid form in the drawings as shaded and in its vapor form as clear; a fireplace heat collector 12 and a solar heat collector 14 for heating and vaporizing the working fluid 11; a heat storage tank 20 located at a lower level of the building filled with a heat storage liquid 22 for extracting heat from the working fluid 11 for storage; a heat exchanger 24 submersed in the storage liquid 22 for transferring heat from heated vaporized working fluid 11 to the storage liquid 22; a closed circulating loop generally designated 26 having a lower collecting reservoir 27 and an upper distributing reservoir 28 for circulating vaporized working fluid 11 from the heat collectors 12, 14 through the heat exchanger 24 for heat extraction, and liquid working fluid from the heat exchanger 24 back through the collectors 12, 14 for heating; and finally a heat distribution system 29 for extracting heat from the heat storage liquid for distribution to the building.

Working Fluid

The working fluid 11 can be any stable, noncorrosive, nontoxic substance that has a suitable liquid vapor phase to serve satisfactorily in the temperature range required. It is desirable to utilize a working fluid 11 that will boil at different pressures over almost the entire temperature range expected at the storage tank 20 so that any heat input in vaporizing the working fluid can be extracted by the heat storage liquid 22 in condensing the vapor back to a liquid as will hereinafter be explained. If water is used as a heat storage liquid 22 for example its liquid temperature range is 32° F. to 212° and it is desirable to have a working fluid 11 that will boil at different pressures over nearly this whole range. Certain Freons manufactured by E. I. DuPont de Nemours and Company will satisfy these requires for a working fluid. For instance "Freon" sold under the trade name of "Genetron #11" has a boiling point of 74.7° at atmospheric pressure and would work satisfactorily in this application.

Heat Collectors

The fireplace heat collector 12 is a grid type device is designed to fit in the hearth of a conventional fireplace and transfer heat from burning logs in the fireplace to the working fluid 11. The fireplace collector 12 comprises a plurality of curved spaced parallel pipes 30 adapted to contain the working fluid 11 connected to a lower level manifold 32 and an upper level manifold pipe 34. This arrangement forms a grid for partially surrounding any open flames produced by burning logs in the fireplace. Heat can thus be collected from the flames and transferred through the pipes 30, 32, 34 to the working fluid 11 for boiling the working fluid.

The upper manifold pipe 34 of the fireplace heat collector 12 is coupled to a vapor conduit 36 which extends upwardly from the fireplace heat collector. Vapor conduit 36 is coupled to another conduit 40 which extends downwardly to the lower collecting reservoir 27. Vaporized working fluid formed in the fireplace heat collector may thus flow upward through conduit 36 and downward through conduit 40 to the lower collecting reservoir 27.

The solar collector 14 is a conventional solar collector panel that is also adapted to contain the working fluid 11 and transfer heat to the working fluid for vaporizing the fluid. The outlet of the solar collector 14 is coupled to a vapor conduit 42 which extends upwardly from the solar collector 14. Vapor conduit 42 is also coupled to downwardly extending conduit 40 so that vaporized working fluid formed in the solar collector 14 may flow from the collector into the lower collecting reservoir 27.

Circulating Loop

The circulating loop 26 generally comprises the lower collecting reservoir 27 and the upper distributing reservoir 28 and various conduits that connect the lower collecting reservoir 27 and upper distributing reservoir 28 to other components of the system. The function of the circulating loop 26 is to circulate vaporized working fluid 11 into the heat exchanger 24 for heat extraction and liquid working fluid 11 into the fireplace 12 and solar 14 heat collectors for heating and vaporizing.

The lower collecting reservoir 27 is a sealed vessel having a pressure tight inner chamber 50 and is coupled at its upper end to vapor conduit 40 for receiving vaporized working fluid 11 from the fireplace 12 and solar 14 heat collectors. The inner chamber 50 is also coupled near its lower end to a conduit 52 from the heat exchanger 24 for receiving liquid working fluid 11 from the heat exchanger 24. In addition a lower collecting reservoir discharge conduit 54 extends a distance into the interior of the chamber 50 for discharging liquid and vaporized working fluid 11 from the lower collecting reservoir 27 to the upper distributor reservoir 28. A check valve 55 is coupled to discharge conduit 54 such that the working fluid may flow from the lower collecting reservoir 27 to the upper distributing reservoir 28 but cannot flow in the opposite direction from the upper distributing reservoir 28 to the lower collecting reservoir 27.

The upper distributor reservoir 28 is a sealed vessel having a sealed inner chamber 55 and is located at a substantial height above the lower collecting reservoir 27 and heat collectors 12, 14. The upper distributing reservoir 28 receives vaporized and liquid working fluid from the lower collecting reservoir 27 and distributes the liquid working fluid by gravity to the heat collectors 12, 14 for heating and the vaporized working fluid by gravity to the heat exchanger 24 for heat extraction. The discharge conduit 54 from the lower collecting reservoir 27 is coupled to the interior chamber 55 of the upper distributing reservoir 28 near the top of the reservoir 28. To move the working fluid 11 from the lower collecting reservoir 27 through the discharge conduit 54 into the upper distributing reservoir 28 pressure must be built up in chamber 50 of the lower collecting reservoir 27 by the vaporized working fluid entering the chamber. Once the pressure in chamber 50 is high enough to overcome the height differential between the lower collecting reservoir 27 and the upper distributing reservoir 28 vaporized and liquid working fluid 11 will move as shown in FIG. 1 from the lower collecting reservoir, through discharge pipe 54 to the upper distributing reservoir 28.

At the upper distributing reservoir 28 the liquid and vaporized working fluid 11 are separated. A vapor supply conduit 58 is coupled to the upper distributing reservoir 28 near the top of chamber 55 for directing vaporized working fluid to the heat exchanger 24. A liquid supply conduit 60 is coupled to the upper distributing reservoir 28 near the lower end of chamber 55 for directing liquid working fluid 11 through the fireplace 12 and solar 14 heat collectors for reheating.

Heat Storage Tank and Heat Exchanger

The heat storage tank 20 is located below the heat collectors 12, 14 and upper distributing reservoir 28. In most buildings the heat storage tank 20 may be conveniently located in the basement of the structure or buried in the ground adjacent to the structure. The heat storage tank 20 comprises a vessel such as a concrete tank vented to atmosphere that is large enough to hold a sufficient volume of the heat storage liquid 22 to store a useable quantity of heat. As shown in FIG. 1 the heat storage tank 20 is filled with the heat storage liquid 22 to the level indicated by wavy line 64. The heat storage liquid 22 may be water or any other stable nontoxic liquid capable of heat storage.

The heat exchanger 24 is a length of coiled tubing submerged within the heat storage liquid 22 near the bottom of the heat storage tank 20. The heat exchanger 24 is coupled at one end to the vapor supply conduit 58 from the upper distributing reservoir and at the other end to conduit 52 to the lower collecting reservoir 27. When the temperature of the storage liquid is lower than the temperature of the heated vaporized working fluid 11 in the heat exchanger 24 heat will flow from the working fluid 11 into the storage liquid 22. If the pressure in the system is such that the condensation temperature of the working fluid 11 is above the temperature of the storage liquid 22 the vaporized working fluid 11 will readily condense in the heat exchanger 20 back to a liquid giving up its heat of vaporization to the storage 22. A liquid separator coupled to the discharge of the heat exchanger 24 as will hereinafter be explained prevents vaporized working fluid from exiting from the heat exchanger 24 until it has condensed back to a liquid. If the pressure in the system is such that the temperature of the storage liquid 22 is higher than the condensation temperature of the working fluid, the working fluid will not condense and the liquid separator 70 will not permit the vaporized working fluid 11 to exit from the heat exchanger 24. The pressure will then build up in the system until the condensation temperature of the working fluid raises above the temperature of the storage liquid 22 and the vaporized working fluid will then condense in the heat exchanger 24 and the liquid will be allowed to pass through the liquid separator 70 to the lower collecting reservoir.

Figure 3:
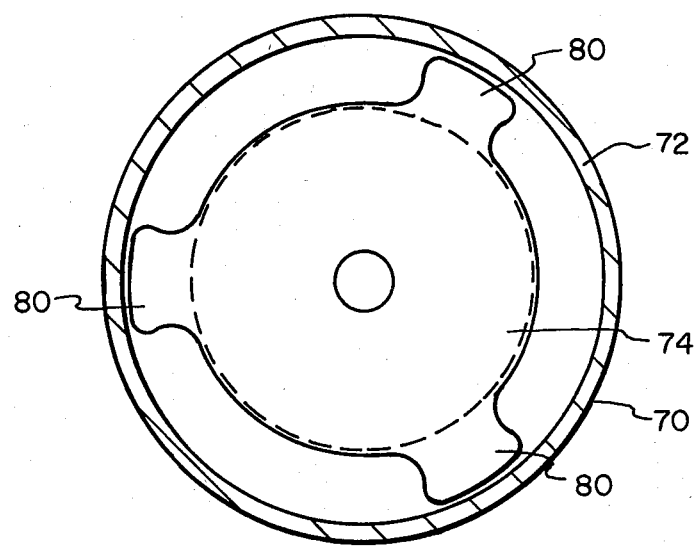
FIG. 3 is section 3—3 of FIG. 2.
Figure 2:
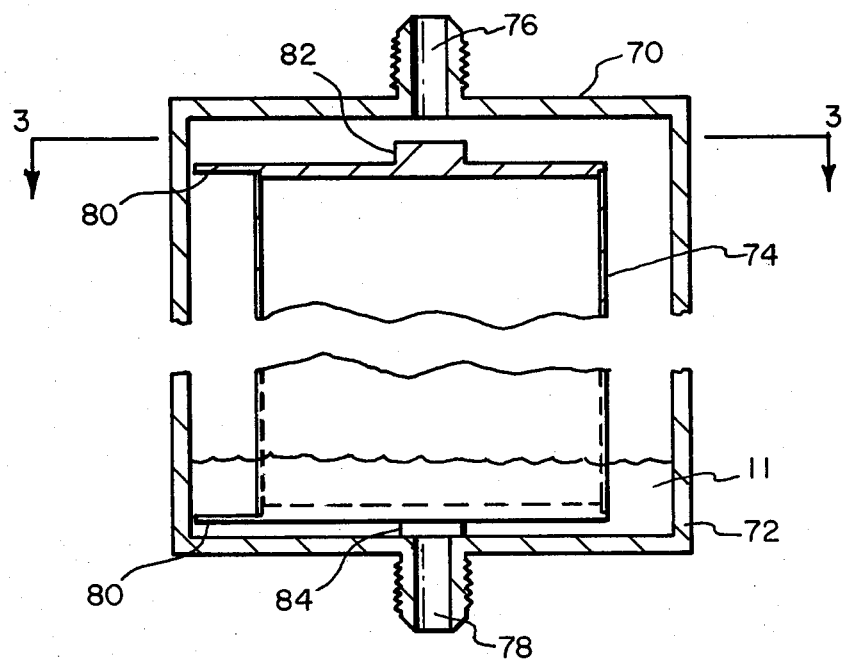
FIG. 2 is an enlarged cross sectional view of a liquid separator component of the invention.

The liquid separator 70 is shown in enlarged views in FIGS. 2 and 3. The liquid separator generally comprises a sealed enclosure 72 having a lightweight float member 74 fitted for up and down movement within the enclosure 72. The enclosure 72 is cylindrical in shape and has a first concentric threaded opening 76 that is coupled by a conduit to the discharge of the heat exchanger 24 and a second concentric threaded opening 78 that is coupled by a conduit to the lower collecting reservoir 27. The float member 74 is also provided with cylindrically shaped tip portions 82, 84 at each end for sealing the openings 76, 78 respectively in the enclosure 72 as the float member 74 moves up and down in the enclosure.

The liquid separator 70 is situated in the vertical position shown in FIG. 2 with port 76 coupled to the heat exchanger 24 and located above port 78 which is coupled to the lower collecting reservoir 27. In operation the force of gravity and gas pressure acting on the upper surface of the float tend to force the float downward as shown in FIG. 2 to a closed position so that opening 76 at the top of the liquid separator 70 is open to the heat exchanger and opening 78 at the bottom of the liquid separator 70 to the lower collecting reservoir 27 is sealed by tip portion 84 of the float member 74. The float member 74 will remain in this position until enough liquid working fluid accumulates at the bottom of the enclosure 72 to overcome the downward gravitational and pressure forces acting on the float member 74 and buoy the float member 74 upward sealing opening 76 with tip portion 82 and allowing the liquid working fluid to flow through opening 78 to the liquid separator 70. When the level of the working fluid 11 drops again the float member 74 again moves to the closed position and seals opening 78 until the liquid level once again rises and the cycle is repeated.

Thus the liquid separator 70 allows only condensed liquid working fluid to exit from the heat exchanger 24. If the temperature of the storage liquid 22 is above the condensation temperature of the working fluid at the system pressure, vaporized working fluid will accumulate in the heat exchanger 24 until the pressure of the system raises and the condensation temperature of the working fluid raises. When the condensation temperature exceeds the temperature of the storage liquid 22, the working fluid can condense in the heat exchanger 24 and the liquid separator will cycle allowing the liquid to exit from the heat exchanger 20 into the lower collecting reservoir 27.

A second liquid gas separator 70(a) identical in construction to the previously described liquid gas separator is coupled to conduit 60 near the liquid discharge end of the upper distributing reservoir 28. Liquid separator 70(a) allows only liquid working fluid to exit from the upper distributing reservoir 28 through conduit 60 to the heat collectors 12, 14 for reheating.

Heat Distribution System

Referring to FIG. 1 the heat distribution system 29 is shown and generally comprises a distributor heat exchanger 90 submerged in the storage liquid 22 within the heat storage tank 20, a heat exchanger tube 92 mounted to the vapor supply conduit 58 of the system circumjacent to the conduit 58, and a plurality of heat radiators 94. The heat distribution system 29 is a closed loop for thermally circulating a heat distribution fluid such as water for picking up heat from the heat storage tank 20 and distributing the heat to the building.

Heat exchanger 90 may be in the form of a coil of metal tubing supported near the top of the heat storage tank submerged in the heat storage liquid. The distributor heat exchanger 90 picks up heat from the storage liquid and heats the water circulating within the heat distributor loop. The discharge end of the distributor heat exchanger 90 is coupled by a conduit 96 to the sealed heat exchanger tube 92 mounted to the vapor supply line 58 so that additional heat is transferred from the heated vaporized working fluid 11 flowing in the vapor supply line 58 to the heated water circulating in the heat distribution loop 29. The heat exchanger tube 92 also functions at the startup of the system to provide immediate heat input into the distribution loop 29 without the necessity of first heating all of the heat storage liquid 72 in the storage tank.

The heat radiators 94 of the heat distributor loop 29 are conventional hot water radiators 94 spaced through the building for distributing the heat collected by the distributor heat exchanger 90 and heat exchanger tube 92 throughout the building. Each radiator 94 may be fitted with a conventional control valve 98 for controlling its output.

Operation

Prior to operation the system is charged with a quantity of a suitable working fluid 11 such as "Genetron #11" at a relatively low pressure such as atmospheric pressure. The heat storage tank 20 is filled with a heat storage liquid 22 such as water which prior to operation will be at room temperature in the range of approximately 60° F. to 70° F. To begin the cycle of operation the fireplace heat collector 12 and solar heat collector 14 are activated and begin to collect heat either separately or simultaneously. The liquid working fluid 11 in the heat collectors 12, 14 soon begins to boil and is transformed from a liquid to a vapor. The heated vaporized working fluid produced in each heat collector 12, 14 then flows through vapor conduits 36, 42 and 40 to the lower collecting reservoir 27. As the working fluid continues to boil in the heat collectors 12, 14 the pressure in the lower collecting reservoir 27 builds up until a pressure sufficient to force the vaporized working fluid 11 and any liquid working fluid 11 in the lower collecting reservoir up to the upper distributing reservoir 28 is reached. The mixture of liquid and vaporized working fluid is thus pushed up the lower collecting reservoir discharge conduit 54 to the upper distributing reservoir 28 where the liquid working fluid is directed by gravity and the pressure in the system through supply conduit 60 to the heat collectors 12, 14 for reheating. Liquid gas separator 70(a) insures that only liquid working fluid exits from the upper distributing reservoir to the heat collectors 12, 14 for reheating. The heated vaporized working fluid 11 on the other hand is directed by gravity and the pressure in the system to the heat exchanger 24. At the heat exchanger 24 the heat of vaporization within the vaporized working fluid is extracted into the heat storage liquid 22 condensing the working fluid from a vapor to a liquid. The working fluid once liquidified is allowed to pass through the liquid separator 70 into the lower collecting reservoir where it is pushed up to the upper distributing reservoir 28 and to the heat collectors 12, 14 for reheating.

As the system continues to operate the temperature of the heat storage liquid 22 within the heat storage tank begins to rise until the temperature exceeds the condensation and boiling temperatures of the working fluid at the system pressure. The working fluid is then unable to condense in the heat exchanger 24. The liquid separator 70 however prevents the vaporized working fluid from discharging from the heat exchanger 24 and the pressure will build up in the system until the condensation temperature of the working fluid rises above the temperature of the heat storage liquid 22. Once the pressure raises enough so that the condensation temperature of the working fluid is increased above the temperature of the heat storage liquid 22, the vaporized working fluid can condense in the heat exchanger 24 further heating the heat storage liquid. The vaporized working fluid is then allowed to pass through the liquid separator 70 and into the lower collecting reservoir 27. Thus the pressure in the system is automatically varied so that the condensation of the working fluid and the operating temperature of the heat collectors 12, 14 follows the temperature of the heat storage liquid 22 in the heat storage tank.

The heat distribution loop 29 begins to operate almost immediately after the working fluid 11 is vaporized picking up heat from the heat storage liquid 22 and vapor supply line 58 and thermally circulating the heat upward to the radiators 94 and then radiating the heat through the radiators 94 to the building. The control valves 98 coupled to each radiator 94 may be utilized to regulate the heat output of each radiator as desired.

Thus the system functions to collect from various heat collectors at any level of the building and distribute the heat throughout the building without any additional energy input. In addition the pressure in the system is varied with the temperature of the heat storage liquid so that the input of the heat collectors follows the temperature of the heat storage liquid. The system operates automatically and requires no expensive controls. The only moving part in the entire system is the working fluid.

If desired a pilot operated pressure control valve can be added upstream from the lower collecting reservoir 27 to further regulate the pressure of the system. The pilot operated pressure control valve may be provided with means for sensing the temperature of the heat storage liquid and varying the pressure of the system upward as the temperature of the heat storage liquid rises and downward as the temperature declines. A capillary tube and bulb filled with the working fluid and submersed in the heat storage liquid for instance may be utilized to sense the storage liquid temperature and operate the pressure control valve to vary the system pressure proportionally with the temperature of the heat storage liquid.

Although the present invention has been described with a certain degree of particularity, it is understood that the present disclosure has been made by way of example and that changes in details of structure may be made without departing from the spirit thereof.

What is claimed is:

1. Apparatus for heating a building or the like comprising:
    a working fluid;
    collector means adapted to contain the working fluid and to transfer heat to the working fluid for boiling and vaporizing the working fluid;
    heat storage means located at a level of the building below the collector means for storing the collected heat;
    a heat exchanger for receiving vaporized working fluid from the collector means for condensing the vaporized working fluid for extracting heat and transferring the heat to the heat storage means;
    heat distributor means for extracting heat from the heat storage means for distributing the heat throughout the building;
    a lower collecting resevoir located at a level below the collector means and the heat exchanger having a sealed chamber coupled to the collector means and to the heat exchanger for receiving vaporized working fluid from the collector means and condensed working fluid from the heat exchanger whereby pressure may be built up in the sealed chamber for moving the vaporized and condensed working fluid to a higher level;
    a liquid separator coupled to the heat exchanger for preventing vaporized working fluid from discharging from the heat exchanger into the lower collecting reservoir until the working fluid condenses;
    an upper distributor reservoir located at a level above the collector means having a sealed chamber coupled to the lower collecting reservoir for receiving vaporized and condensed working fluid from the lower collecting reservoir and coupled to the heat exchanger at its upper end for distributing the vaporized working fluid to the heat exchanger and coupled to the collector means at its lower end for distributing the condensed working fluid to the collector means; and liquid separator means located between the upper distributor reservoir and collector means for preventing vaporized working fluid from discharging from the upper distributor reservoir into the collector means.

2. Apparatus as recited in claim 1 and wherein the heat storage means is a tank filled with water and the heat exchanger is submerged in the water.

3. Apparatus as recited in claim 2 and wherein the collector means is a solar collector panel.

4. Apparatus as recited in claim 3 and wherein the solar collector panel is coupled to a fireplace heat collector.

5. Apparatus as recited in claim 1 and wherein the heat distributor means is a closed pipe loop for thermally circulating water from the heat storage means for picking up heat to radiators throughout the building for distributing the heat.

6. Apparatus for heating a building or the like comprising:

a working fluid;

heat collector means adapted to contain the working fluid and to collect heat for heating and vaporizing liquid working fluid;

a heat storage tank located at a level in the building below the heat collector means and having a heat storage liquid for storing the collected heat;

a heat exchanger submerged within the heat storage liquid for receiving heated vaporized working fluid from the heat collector means for extracting heat from the vaporized working fluid and transferring the heat to the storage liquid;

a first pressurized vessel located at a level below the heat storage tank and coupled to the heat collector means at its upper end and heat exchanger for receiving liquid and vaporized working fluid from the heat collector means and the heat exchanger whereby pressure may be built up for moving the liquid and vaporized working fluid to a higher level;

a liquid separator means coupled between the heat exchanger and first pressurized vessel for preventing vaporized working fluid from discharging from the heat exchanger until the vaporized working fluid has condensed;

a second pressurized vessel located at a level in the building above the heat collector means and coupled to the first pressurized vessel, to the heat collector means at its lower end, and to the heat exchanger at its upper end, for receiving liquid and vaporized working fluid from the first pressurized vessel and distributing the liquid working fluid to the heat collector means for heating and the vaporized working fluid to the heat exchanger for heat extraction;

a liquid separator located between the upper distributor reservoirs and collector means for preventing vaporized working fluid from discharging from the upper distributor reservoir into the collector means; and heat distributor means for picking up heat from the storage liquid and distributing the heat to the building.

7. Apparatus as recited in claim 6 and further comprising a second liquid separator means coupled to the second pressurized vessel for preventing vaporized working fluid from discharging from the second pressurized vessel to the heat collector means.

8. Apparatus as recited in claim 7 and wherein the heat distributor means comprises;

a closed pipe loop adapted to contain water;

a second heat exchanger coupled to the pipe loop submerged in the heat storage liquid for picking up heat from the heat storage liquid; and a plurality of heat radiators located throughout the building at levels higher than the storage tank whereby the water may thermally circulate through the pipe loop picking up heat from the storage liquid and distributing the heat through the heat radiators to the building.

9. Apparatus as recited in claim 8 and wherein the heat collector means is a solar collecting panel adapted to contain the working fluid and to heat the working fluid with solar radiation.

10. Apparatus as recited in claim 8 and wherein the heat collector means is a fireplace heat collector adapted to contain the working fluid and to collect heat from a burning fireplace for heating the working fluid.

11. Apparatus as recited in claim 8 and wherein the heat collector means is a solar collecting panel and a fireplace heat collector adapted to contain the working fluid and coupled together for collecting heat and heating the working fluid.

12. Apparatus as recited in claim 8 and wherein the working fluid is water.

13. Apparatus as recited in claim 8 and wherein the working fluid is freon.

* * * * *